UNITED STATES PATENT OFFICE.

UTLEY WEDGE, OF ARDMORE, PENNSYLVANIA.

PREPARING FINE PARTICLES OF IRON OXID FOR USE IN BLAST-FURNACES.

No. 889,563.   Specification of Letters Patent.   Patented June 2, 1908.

Application filed November 13, 1907. Serial No. 402,014.

*To all whom it may concern:*

Be it known that I, UTLEY WEDGE, a citizen of the United States, residing in Ardmore, Pennsylvania, have invented certain Improvements in Preparing Fine Particles of Iron Oxid for Use in Furnaces, of which the following is a specification.

The object of my invention is to prepare, for use in blasts or open-hearth furnaces, relatively fine particles of oxid of iron such as the red hematite ores and the cinder resulting from the desulfurization of iron pyrites in the manufacture of sulfuric acid. These relatively fine particles of oxid of iron are not available for use in blast furnaces first, because of their tendency to pack and render the furnace charge too dense for the passage of the blast therethrough, and secondly, because, when a high-pressure blast is used, they are liable to be carried off thereby and deposited in the flues of the furnace.

When the oxid is intended for use in open-hearth furnaces, whether acid or basic, it is important that it should not be combined with any material which would retard or otherwise interfere with the intended action of said furnace. In my Letters Patent No. 804,393, dated November 14, 1905, I described a method of utilizing such fine particles of iron oxid by mixing the same with Portland cement or cement material, and then causing the nodulizing or agglomeration of the fine particles of the oxid by subjecting the said mixture to heat and agitation in a rotating kiln similar to that used for burning cement. I find, however, that lime is preferable to cement or cement material for the purpose, since the lime will better take up any moisture contained in the oxid and will thus perform the double function of acting as a flux for said oxid and effecting the drying of the same, which makes the mechanical handling of the oxid easier, especially if it is derived from the desulfurization of iron pyrites which is afterwards subjected to a leaching operation to extract the copper therefrom.

From three to four per cent. of lime will usually be found sufficient to effect the desired results.

I prefer to use what are known as lime "forkings", the same being air-slaked or partially air-slaked lime which is in a relatively fine state and is separated from the larger pieces of lime at the kiln. This air-slaked or partially air-slaked lime, being unavailable for building purposes, can be purchased at a low price, and I find that it answers better than the limestone referred to in my previous patent and practically as well as quicklime for my purpose, it being only necessary that it shall possess sufficient affinity for moisture to enable it to effect the required drying of the oxid.

After the mixture of lime and iron oxid has been prepared, it is subjected to the action of the kiln in the same manner as before, the combined effect of the heat and agitation causing the oxid to form lumps or nodules of varying sizes, and so hard as to resist disintegration by handling or while being introduced as part of the furnace charge.

I claim:—

1. The mode herein described of preparing relatively fine particles of iron oxid for use in furnaces, said mode consisting in mixing said particles with lime in order to take up moisture and act as a flux, and then subjecting the mixture to combined heat and agitation to form the same into lumps or nodules.

2. The mode herein described of preparing relatively fine particles of iron oxid for use in furnaces, said mode consisting in mixing said particles with air-slaked lime in order to take up moisture and act as a flux, and then subjecting said mixture to combined heat and agitation to cause it to form lumps or nodules.

In testimony whereof, I have signed my name to this specification, in the presence of two subscribing witnesses.

UTLEY WEDGE.

Witnesses:
  HAMILTON D. TURNER,
  KATE A. BEADLE.